No. 748,852. Patented January 5, 1904.

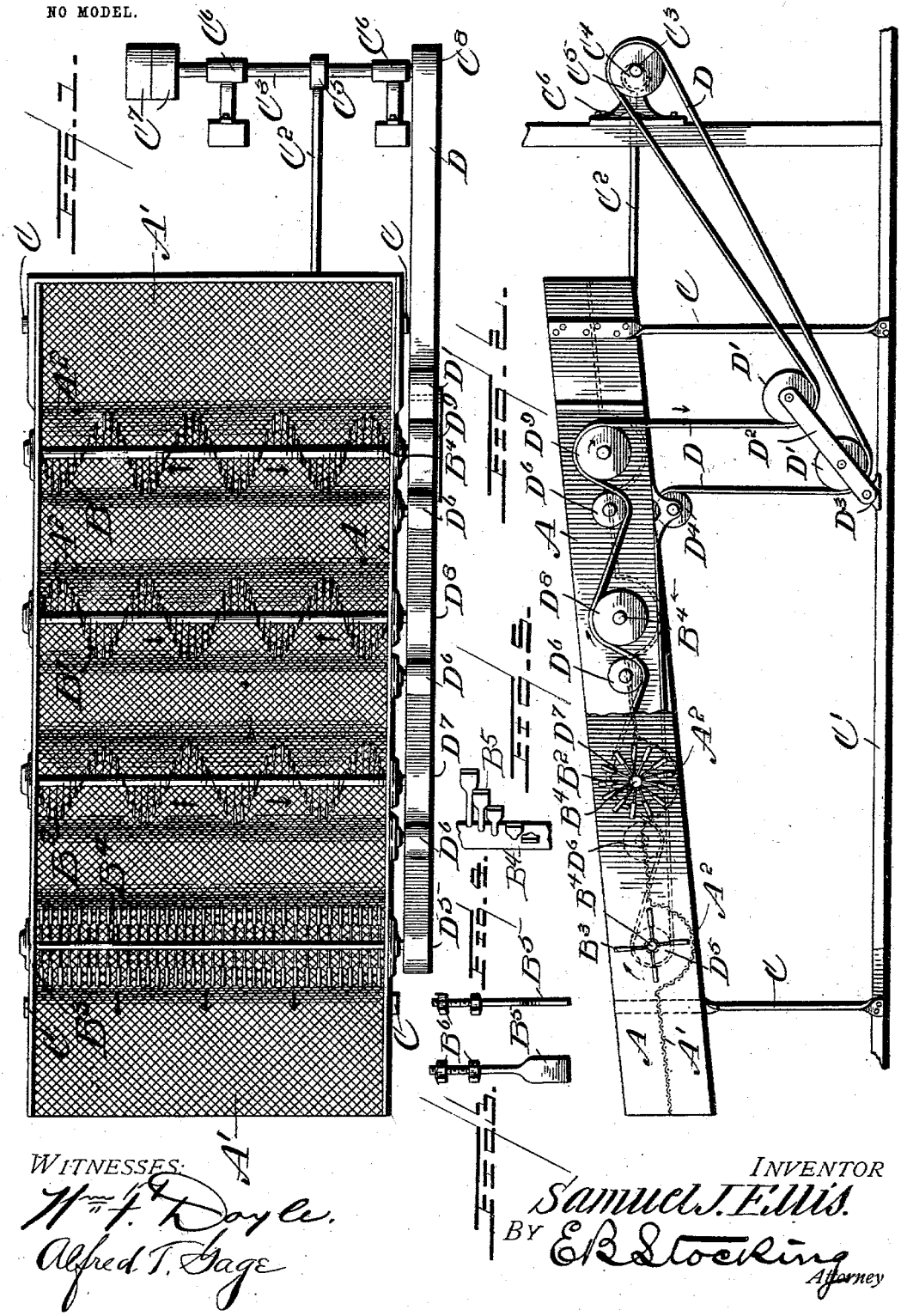

UNITED STATES PATENT OFFICE.

SAMUEL J. ELLIS, OF MEMPHIS, TENNESSEE, ASSIGNOR TO WILLIAM C. ELLIS & SONS, OF MEMPHIS, TENNESSEE.

SEED-HULLER.

SPECIFICATION forming part of Letters Patent No. 748,852, dated January 5, 1904.

Application filed March 28, 1903. Serial No. 150,025. (No model.)

*To all whom it may concern:*

Be it known that I, SAMUEL J. ELLIS, a citizen of the United States, residing at Memphis, in the county of Shelby, State of Tennessee, have invented certain new and useful Improvements in Seed-Hullers, of which the following is a specification, reference being had therein to the accompanying drawings.

This invention relates to a seed-huller, and particularly to a construction embodying a beating and shaking action for removing the hulls from the seed and separating the hulls therefrom.

The invention has for an object to provide a reticulated table having beaters thereon and giving a shaking movement to effect a separation of the seed from the hulls.

A further object of the invention is to arrange the beater-blades upon their shafts so as to effect a lateral feed across the troughs in which the said blades operate, such feed being successively reversed to distribute the material automatically over the table.

A further object of the invention is to provide a reciprocating table having rotatable beaters thereon with driving connections for said beaters adapted to maintain constant operative relation in the reciprocation of the table.

Other and further objects of the invention will be hereinafter set forth and the novel features thereof defined by the appended claims.

In the drawings, Figure 1 is a plan of the invention. Fig. 2 is a side elevation with parts broken away. Figs. 3 and 4 are details of one of the beater-blades, and Fig. 5 is a diagrammatic illustration of the relative position of these blades upon their shafts.

Like letters of reference refer to like parts in the several figures of the drawings.

The letter A designates a table of any preferred construction having a reticulated bottom A' of any suitable material, said bottom being provided with troughs or pockets $A^2$, within which the beaters B, B', $B^2$, and $B^3$ are disposed. Each of these beaters is provided with a driving-shaft $B^4$, mounted in suitable bearings in the side walls of the table A, and blades or paddles $B^5$, secured thereto in any desired manner—for instance, by means of a nut upon threaded end, as shown at $B^6$ in Fig. 3. The blades or paddles upon the shafts at the feed end of the table are preferably spirally arranged upon their shafts, as shown in Fig. 1, and the blades upon the beater B extend in opposite directions from the center toward each end, having one half of a left-hand thread and the opposite half of a right-hand thread, thus carrying the material from the center of the trough toward the ends thereof in the feed. The beater B' in the next successive trough is reversed in direction at the opposite ends thereof, which feed toward the center, while the beater $B^2$ in the next trough is again reversed to feed from the center to the ends, as in the case of the beater B. It will be obvious that the number of these beaters may be varied, as found most desirable in the work to be accomplished, and it is often found desirable to provide the beater $B^3$ at the lower end of the table with the blades arranged in straight lines across the same, as shown in Figs. 1 and 2, so as to feed the material directly from the trough thereof. The table A is mounted for a reciprocatory vibration in order to shake or sift the material through the perforated bottom thereof, and this may be effected by any desired construction—for instance, spring-standards C, secured at opposite ends to the table and base, the standards at the delivery end of the table being of less length than at the feed end, so as to properly incline the table. The vibratory or shaking motion is imparted to the table by means of a connecting-rod $C^2$, which extends from the driving-shaft $C^3$, having thereon an eccentric $C^4$, which is surrounded by a sleeve $C^5$, carried by the rod $C^2$. This driving-shaft is mounted in suitable bearings $C^6$ and provided with the usual driving-pulleys $C^7$, to which power is applied from any suitable source. This shaft $C^3$ is also provided with a belt-pulley $C^8$, adapted to receive the driving-belt D for rotating the beaters upon the table. This belt is carried from the driving-pulley over the swinging idlers D', which are mounted in the frame $D^2$, pivoted upon the base at $D^3$, and this disposes the driving-belt in a vertical line at the side of table, so as to prevent any strain upon the belt in the vibration of the table. One layer of the belt extends from the lower swinging idler over the depending idler D⁴ upon the table, thence over the driving-pulley D⁵ upon the beater B³ and under the fixed idler D⁶ upon the side of the table, thence over the driving-pulley D⁷ upon the beater B² and under a similar idler D⁶. From this latter idler the belt passes over the driving-pulley D⁸ on the shaft of the beater B' and under the idler D⁶, thence over the driving-pulley D⁹ upon the beater B, whence it passes downward in a vertical line under one of the swinging idlers and back to the pulley upon the driving-shaft. By this construction and arrangement the beaters are each rotated toward the delivery end of the table and the material fed thereby downward over the table and also transversely through the troughs or pockets.

In the operation of the invention the spirally-disposed paddles comprising the rotary beaters feed the material transversely of the troughs toward opposite ends thereof and in the next successive trough back toward the center, thus securing both a lateral and longitudinal feed over the reticulated table and effecting a most thorough hulling of the seed, while the vibratory motion imparted to the table by the eccentric upon the driving-shaft thoroughly separates the hulls from the seeds in the passage over and upon the table. The beaters within the troughs in the table move therewith in its vibration, and thus allow for a close adjustment with the reticuled walls thereof, while the material is automatically distributed within and over the perforated surfaces by the spiral arrangement of the beaters, thus facilitating the separation and sifting of the seeds from the hulls. The driving connections herein disclosed effect a continuous rotation of the beater-shaft and vibration of the table without undue strain or vibration upon the driving-belt in the horizontal movement of the table. When the seeds and hulls fall into the troughs, the hulls being the lighter and more bulky are quickly carried out of the troughs by the revolving beaters, thus affording the seeds an opportunity to sift through the bottom of the trough.

While this invention is particularly adapted to the separation of cotton-seed meats from their hulls, it is also intended for use in connection with the hulling of any character of seed or grain.

It will be obvious that changes in the details of construction and configuration may be made without departing from the spirit of the invention as defined by the appended claims.

Having described my invention and set forth its merits, what I claim, and desire to secure by Letters Patent, is—

1. In a seed-huller, a reticulated table having transverse troughs therein, transverse rotating beaters disposed in said troughs, means for longitudinally vibrating said table, and means for driving said beaters.

2. In a seed-huller, a reticulated table having transverse troughs therein, transverse rotating beaters disposed in said troughs, means for vibrating said table, means for driving the under side of said beaters toward the delivery end of the table, and yielding supports at opposite ends of said table for retaining same in an inclined position.

3. In a seed-huller, a reticulated table having troughs therein, rotating beaters disposed within said troughs, means for vibrating said table, means for driving said beaters, yielding supports at opposite ends of said table for retaining same in an inclined position, a driving-shaft having a cam thereon for operating the vibrating means with said table, a driving-pulley upon said shaft, a belt extending from said pulley to the shafts of the beaters upon the table, and a swinging idler located upon a fixed support to dispose said belt in a vertical plane adjacent to its connection with the table.

4. In a seed-huller, a table having a reticulated bottom with a transverse trough therein closed at opposite ends, a beater in said trough having blades thereon extending spirally in opposite directions from the center of the table toward the opposite ends of the beater, and means for rotating said beater whereby material fed longitudinally of the table is spread laterally thereon.

5. In a seed-huller, a table having a reticulated bottom with troughs therein closed at opposite ends, beaters in said troughs having blades thereon arranged spirally to feed in opposite directions from the center of the table toward the opposite ends of each beater, means for rotating said beaters, and a delivery-beater having blades thereon arranged in straight lines transversely of the table.

6. In a seed-huller, a table having a reticulated bottom with troughs therein rotatable seed-beaters located in said troughs and having driving-pulleys upon one end of the shaft thereof, fixed idlers between said driving-pulleys, a driving-belt passing over each of said pulleys and under each of said idlers, a driving-shaft upon a fixed support and over which said belt extends, and means to reciprocate said table longitudinally.

7. In a seed-huller, a table having a reticulated bottom with troughs therein rotatable seed-beaters located in said troughs and having driving-pulleys upon one end of the shaft thereof, fixed idlers disposed between said driving-pulleys, a driving-shaft passing over each of said pulleys and under each of said idlers, a driving-shaft having a pulley thereon, a swinging arm provided with idlers adapted to bear upon the driving-belt and to dispose same in a vertical plane adjacent to its connection with the table, and means for vibrating said table.

8. In a seed-huller, a reticulated table having troughs therein closed at opposite ends, beaters disposed in said troughs and having blades thereon spirally arranged to successively feed material longitudinally of the troughs in opposite directions by each successive beater in its passage over the table, and means for driving the under side of said beaters toward the delivery end of the table.

9. In a seed-huller, a reticulated table having troughs therein closed at opposite ends, beaters disposed in said troughs and having blades thereon spirally arranged to successively feed material longitudinally of the troughs in opposite directions by each successive beater in its passage over the table, means for driving the under side of said beaters toward the delivery end of the table, and a delivery-beater having blades thereon arranged in straight lines transversely of the table.

10. In a seed-huller, a reticulated table having troughs therein, beaters disposed in said troughs and having blades thereon spirally arranged to successively feed material longitudinally of the troughs in opposite directions by each successive beater in its passage over the table, means for driving the under side of said beaters toward the delivery end of the table, a delivery-beater having blades thereon arranged in straight lines transversely of the table, a yielding support for the opposite ends of said table, and means for vibrating said table longitudinally.

In testimony whereof I affix my signature in presence of two witnesses.

SAMUEL J. ELLIS.

Witnesses:
WM. J. ELLIS,
HENRY C. ELLIS.